(12) United States Patent
Alvarez Valenzuela et al.

(10) Patent No.: US 10,897,212 B2
(45) Date of Patent: Jan. 19, 2021

(54) ARRANGEMENT FOR SWITCHING ON A TWO-WAY SWITCH OF A CONVERTER MODULE, CONVERTER MODULE FOR A MODULAR MULTI-LEVEL CONVERTER HAVING THE ARRANGEMENT AND METHOD FOR PRODUCING OPERATIONAL STANDBY FOR A CONVERTER MODULE HAVING A TWO-WAY SWITCH

(71) Applicant: SIEMENS AKTIENGESELLSCHAFT, Munich (DE)

(72) Inventors: Rodrigo Alonso Alvarez Valenzuela, Nuremberg (DE); Joerg Dorn, Buttenheim (DE); Herbert Gambach, Uttenreuth (DE); Frank Schremmer, Fuerth (DE)

(73) Assignee: Siemens Aktiengesellschaft, Munich (DE)

( * ) Notice: Subject to any disclaimer, the term of this patent is extended or adjusted under 35 U.S.C. 154(b) by 97 days.

(21) Appl. No.: 16/061,737

(22) PCT Filed: Nov. 21, 2016

(86) PCT No.: PCT/EP2016/078331
§ 371 (c)(1),
(2) Date: Jun. 13, 2018

(87) PCT Pub. No.: WO2017/108296
PCT Pub. Date: Jun. 29, 2017

(65) Prior Publication Data
US 2018/0375440 A1    Dec. 27, 2018

(30) Foreign Application Priority Data
Dec. 21, 2015    (DE) .................... 10 2015 226 199

(51) Int. Cl.
*H02M 7/483*    (2007.01)
*H02M 1/36*    (2007.01)
*H02M 1/00*    (2006.01)

(52) U.S. Cl.
CPC ............. *H02M 7/483* (2013.01); *H02M 1/36* (2013.01); *H02M 2001/0032* (2013.01); *H02M 2007/4835* (2013.01)

(58) Field of Classification Search
CPC .......... H02M 1/32; H02M 3/15; H02M 3/156; H02M 2001/0009; H02M 2001/325;
(Continued)

(56) References Cited

U.S. PATENT DOCUMENTS 4,523,873 A    6/1985    Baues
4,743,752 A *  5/1988    Olsen .................... G01D 5/268
                                                              250/206.1
(Continued)

FOREIGN PATENT DOCUMENTS

DE    0075699        8/1982
DE    10305986 A1    9/2004
(Continued)

OTHER PUBLICATIONS

Lesnicar, et al; "An Innovative Modular Multilevel Converter Topology Suitable for a Wide Power Range", IEEE Bologna Power Tech Conference; Jun. 23-26, 2003; pp:1-6; Bologna, Italy.
(Continued)

*Primary Examiner* — Thienvu V Tran
*Assistant Examiner* — Nusrat Quddus
(74) *Attorney, Agent, or Firm* — Laurence Greenberg; Werner Stemer; Ralph Locher

(57) ABSTRACT

The subject of the present invention is an arrangement for switching on a two-way switch of a converter module. A power generation device for providing electric power for
(Continued)

switching on the two-way switch is provided that is suitable for converting electromagnetic radiation into electrical power. There is also described a converter module for a modular multi-level converter having the arrangement and a method for producing operational standby for a converter module having a two-way switch.

18 Claims, 4 Drawing Sheets

(58) Field of Classification Search
CPC .......... H02M 7/5395; H02M 7/53871; H02M 7/7575; H02M 2007/4835; H02M 1/00; H02M 1/36; H02M 7/483
See application file for complete search history.

(56) References Cited

U.S. PATENT DOCUMENTS

| | | | | |
|---|---|---|---|---|
| 5,600,322 | A * | 2/1997 | Garavan | H03M 1/144 |
| | | | | 341/120 |
| 5,852,415 | A * | 12/1998 | Cotter | H03M 1/1028 |
| | | | | 341/120 |
| 7,869,707 | B2 | 1/2011 | Hampel | |
| 8,610,384 | B2 * | 12/2013 | Dommaschk | H02P 3/22 |
| | | | | 318/370 |
| 10,056,868 | B2 * | 8/2018 | Deliwala | H03F 3/08 |
| 2014/0121787 | A1 * | 5/2014 | Yamazaki | H04L 12/2825 |
| | | | | 700/19 |
| 2014/0362628 | A1 | 12/2014 | Eckel | |
| 2015/0155700 | A1 * | 6/2015 | Alvarez Valenzuela | |
| | | | | H03K 17/0822 |
| | | | | 361/93.9 |
| 2015/0162902 | A1 * | 6/2015 | Lizama | H03K 17/082 |
| | | | | 327/376 |
| 2015/0214828 | A1 | 7/2015 | Zhang et al. | |
| 2015/0277403 | A1 * | 10/2015 | Yamane | H02M 3/156 |
| | | | | 700/298 |
| 2016/0156421 | A1 * | 6/2016 | Aviv | G02B 6/3849 |
| | | | | 398/40 |
| 2017/0133924 | A1 * | 5/2017 | Alvarez Valenzuela | |
| | | | | H02M 1/32 |
| 2019/0028038 | A1 * | 1/2019 | Alvarez Valenzuela | |
| | | | | H02M 7/483 |
| 2019/0044620 | A1 * | 2/2019 | Alvarez Valenzuela | |
| | | | | G08C 23/06 |

FOREIGN PATENT DOCUMENTS

| | | |
|---|---|---|
| DE | 102013213263 A1 | 1/2015 |
| EP | 2276174 B1 | 7/2015 |
| EP | 2678931 B1 | 11/2015 |
| WO | 2012116738 A1 | 9/2012 |
| WO | 2013060354 A1 | 5/2013 |

OTHER PUBLICATIONS

Andreas Lindemann; "A New IGBT with Reverse Blocking Capability"; IXYS Corperation.
"EPC C1G2 Compliant Batteryless Sensor/Actuator Development Platform Powered by ANDY100"; Sep. 2014; Product brief by www.farsens.com.
Vincent Liu, et al.; "Ambient Backscatter: Wireless Communication Out of Thin Air"; SIGCOMM'13; Aug. 12-16, 2013; Hong Kong, China.
Christian Klumpner, et al.; "Using Reverse-Blocking IGBTs in Power Converters for Adjustable-Speed Drives"; IEEE Transactions on Industry Applications; May/Jun. 2006; vol. 42, No. 3; IEEE.
Mikel Choperena; "Battery-less wireless temperature sensors based on low power UHF RFID tags"; Jun. 2013; MWEE.
E. R. Motto, et al.; "Application Characteristics of an Experimental RB-IGBT (Reverse Blocking IGBT)" Module; Industry Applications Conference, 2004. 39th IAS Annual Meeting; Oct. 3-7, 2004; IEEE; Seattle, WA, USA.
Nitesh Satheesh, et al.; "Moving forward with reverse-blocking IGBTs"; PSD; May 3, 2014.

* cited by examiner

PRIOR ART

PRIOR ART

PRIOR ART

ARRANGEMENT FOR SWITCHING ON A TWO-WAY SWITCH OF A CONVERTER MODULE, CONVERTER MODULE FOR A MODULAR MULTI-LEVEL CONVERTER HAVING THE ARRANGEMENT AND METHOD FOR PRODUCING OPERATIONAL STANDBY FOR A CONVERTER MODULE HAVING A TWO-WAY SWITCH

BACKGROUND OF THE INVENTION

Field of the Invention

The invention relates to an arrangement for switching on a two-way switch of a converter module, a converter module for a modular multi-level converter having the arrangement, and a corresponding method.

From WO 2013/060354 it is known to provide a two-way switch in a bridge circuit of a converter module, e.g. for a modular multi-level converter of a high-voltage DC transmission system. This two-way switch is capable, under appropriate control, of blocking the converter module for not only one but both current directions. This has the advantage that in the event of a short-circuit on the DC voltage side of a converter, only a reduced reaction is produced on the AC voltage side. The interruption of the power flow in itself already produces a reaction, but one which is small compared to the prevented short-circuit. From WO 2012/116738 modules for converters with two-way switches are also known. A suitable IGBT for a two-way switch with the appropriate capability for reverse blocking a current is known, for example, from the product advertisement "Moving forward with reverse-blocking IGBTs", by Nitesh Satheeesh et al., Fuji Electric May 3, 2014. The article "Using Reverse-Blocking IGBTs in Power Converters for Adjustable-Speed Drives" by Klumpner et al., IEEE 2006 also deals with current concepts for two-way switches.

In two-way switches, semiconductor switches are used, which are only switched to conducting mode by applying a control voltage to the respective gate. For this reason, the semiconductor switches in the two-way switch are open or in a blocking state before the converter module is switched on. As a peculiarity in the use of a two-way switch in a converter module (e.g. in a converter for high-voltage direct current (HVDC) transmission), the problem therefore arises that no pre-charging of the capacitor in the converter module can take place, because both current directions are blocked. Therefore, the converter module cannot be prepared for operation on first use or after a maintenance period.

In the case of a conventional electrical energy supply, e.g. via a current transformer, the high voltage level, for example in an HVDC plant, gives rise to high technical complexity for an appropriate insulation, which causes high costs. A power supply with a battery does not solve the problem either, because this has a limited service life and therefore after a certain period of time it incurs maintenance costs and reduced availability of a converter module.

SUMMARY OF THE INVENTION

The object of the invention is to specify an arrangement for switching on a two-way switch of a converter module, with which the operational standby of the converter module can be established in a particularly safe and comparatively cost-effective manner.

The invention achieves this object by means of an arrangement as claimed.

According to the invention therefore, a small quantity of electric energy is first provided by conversion from electromagnetic radiation and the two-way switch is closed in at least one current direction. The capacitor of the converter module can then be pre-charged. The converter module is therefore ready for operation.

While DE 10 2013 213 263 discloses a power converter with a sub-module and an energy consumer, such as a control device, wherein in this case however, electrical energy for the energy consumer is provided via a generator driven by means of kinetic energy. The kinetic energy is generated, for example, by means of compressed air or pumped-in water or oil, which drives a turbine or acts on piezo-electric components. Voltages of a few volts need to be generated in order to be able to provide the relatively high energy requirement for a control device. Methods such as laser light, fiber-optic cables, batteries or solar cells continue to be proposed for supplying the power, but these options have proved to be inadequate in regard to the amount of electrical energy that can be generated and are technically complicated. In particular, it is pointed out that a high-voltage system can be powered up quickly using the kinetic energy of the compressed air or liquid, which would not be feasible with the other options.

In contrast, in the conversion of electromagnetic radiation into electrical energy, comparatively small amounts of electric energy can be provided quickly enough to allow the two-way switch to be switched on after a maximum of a few minutes. This method is therefore suitable for making a power converter ready for operation before initial operation or after a maintenance operation.

In a preferred embodiment of the arrangement according to the invention, the energy generation device comprises a solar cell. This is an advantage, because solar cells are inexpensive and are easily able to supply the required quantity of electrical energy. Currently available IGBTs require gate charges of approx. 10-20 μC in order to switch. If one assumes as reference values that in direct sunlight approximately 10 mW/cm^2 of energy are irradiated and that a solar cell could convert 10% of such a quantity of energy into electrical energy, then according to the following equation, with a solar cell of a surface area of 1 cm^2 it will take 300 ms to charge up from 20 μC to 15 V.

$$t = Q/P*U = 20\ \mu AS/lmVA*15V = 300\ ms.$$

Usually, power generating systems with arrangements according to the invention are not arranged outdoors and exposed to sunlight, but in halls or basements. In such a case, the required amount of light can also be provided by artificial light, e.g. by the light being turned on for a few minutes when powering up a modular multi-level converter in a hall, or by the solar cell of the respective module being selectively irradiated with light. This could be carried out manually by an engineer with a headlamp or automatically by, for example, a ceiling floodlight, which is moved automatically under computer control to irradiate all solar cells for a short period of time.

In another preferred embodiment of the arrangement according to the invention, the energy generation device comprises a photodiode. This is an advantage because photodiodes are simple, cost-effective and have been proven in practice over a long time.

In another preferred embodiment of the arrangement according to the invention, the photo diode is connected to a fiber-optic cable. This is advantageous because in this way, the amount of energy required can be transported to each module in a closed system. There is no dependency on the light intensity or illumination of the environment, because the fiber-optic cable is connected both to the photodiode and also to a suitable light source.

In another preferred embodiment of the arrangement according to the invention, the fiber-optic cable is additionally connected to a communication device of the converter module. This is an advantage because fiber-optic cables are usually already provided for data communication with a communication device of the converter module. If, for example an optical divider is then arranged in front of the communication module, then in a first mode light can be routed via the fiber-optic cable to the photodiode, and in a second mode the light can be routed to the communication module for data communication. A mixed form, in which for example a semi-transparent mirror is used as the optical divider so that light is directed to the photodiode and communications device at the same time, can also be applied to advantage.

In another preferred embodiment of the arrangement according to the invention, the energy generation device is designed only for using ambient electromagnetic radiation, such as radio or television signals, for energy production. This is an advantage, because radio signals, for example, are frequently available at the deployment location of modules according to the invention, which can be exploited for energy production. This technique, which is often used in so-called "Ambient Backscatter" systems, is known from the publication "Ambient Backscatter: Wireless Communication Out of Thin Air" by Vincent Liu et al., University of Washington, published in SIGCOMM '13, Aug. 12-16, 2013, Hong Kong, China. It describes devices that can communicate with each other while only requiring ambient electromagnetic radiation (or ambient radio frequency signals), such as television signals, for their energy supply. The ambient electrical radiation is back-scattered by a device in modified form, in order to transmit information such as signals of a touch sensor. Furthermore, the web article "Battery-less wireless temperature sensors based on low power UHF RFID tags," 10 Jun. 2013 by Mikel Choperena ("http://www.sensorsmag.com/product/development-platform-advances-battery-free-sensors-and") describes sensors supplied by the Farsens company. These sensors exploit RFID with ultra-high-frequency signals (approx. 900 MHz) and measure temperature, pressure, air humidity, etc. Such a sensor is also known from the product brochure "EPC C1G2 COMPLIANT BATTERYLESS SENSOR/ACTUATOR DEVELOPMENT PLATFORM POWERED BY ANDY100 PB-MEDUSA-V01" published by the Farsens company in September 2014.

In another preferred embodiment of the arrangement according to the invention, the energy generation device comprises an energy storage unit. This is an advantage because the electric energy generated can then be collected and temporarily stored until the two-way switch can be switched.

In another preferred embodiment of the arrangement according to the invention, the energy storage unit comprises a capacitor. This is an advantage because capacitors are durable and can be quickly charged/discharged.

In another preferred embodiment of the arrangement according to the invention, the energy storage unit comprises a super-capacitor. This is an advantage, because a super-capacitor is durable and can be quickly charged/discharged.

A further object of the invention is to specify a converter module which can be brought to an operational standby particularly safely and comparatively cost-effectively.

The invention achieves this object by means of a converter module as claimed. The same advantages as those described above for the arrangement according to the invention apply mutatis mutandis.

A further object of the invention is to specify a method with which the operational readiness of a converter module is produced particularly safely and comparatively cost-effectively.

The invention achieves this object by means of a method as claimed. The same advantages apply mutatis mutandis to the method according to the invention and its embodiments in accordance with the dependent claims, as those described above for the arrangement according to the invention.

In the interests of a better explanation the invention will be described schematically on the basis of preferred exemplary embodiments.

DESCRIPTION OF THE INVENTION

Figure 1:
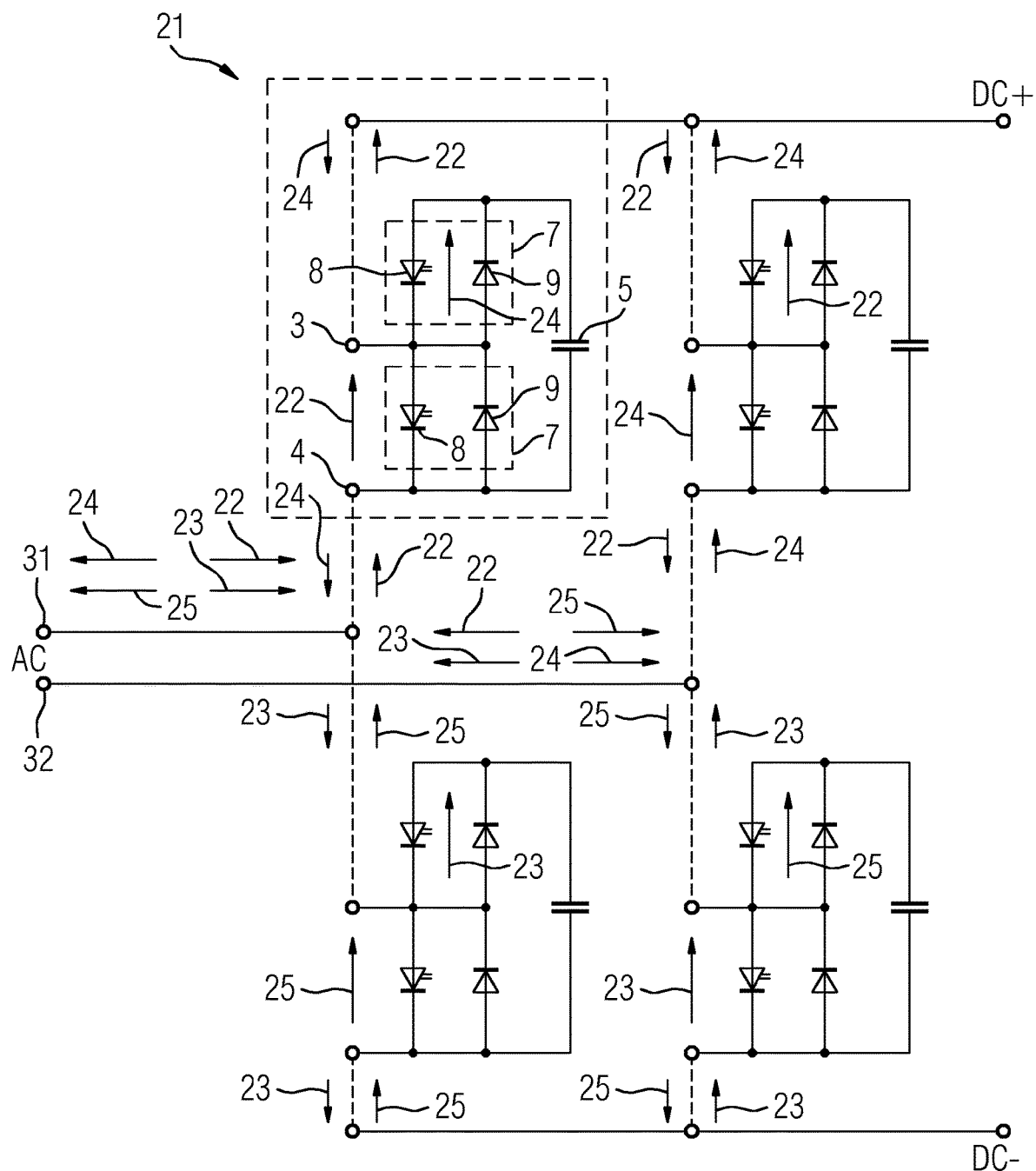
FIG. 1 shows a structure of a known multi-level converter with free-wheeling diodes.

FIG. 1 shows a highly simplified structure of a modular multilevel converter with two phases 31,32 on the AC voltage side AC and two terminals DC+, DC− on the DC voltage side. The converter in this example has four modules 21, which are designed identically. Two converter modules 21 are provided for each phase. The converter module 21 (top left) is described in more detail: it has two semiconductor switches 8, to each of which an anti-parallel (i.e. with a reverse current path enabled) freewheeling diode 9 is connected in parallel. Between the semiconductor switches 8, which are implemented as IGBTs, a central terminal 3 is provided, which is connected to the DC voltage side DC+. A capacitor 5 is arranged in parallel with the semiconductor switches. Semiconductor switches 8 and freewheeling diode 9 each form a one-way switch 7, i.e. such that the semiconductor switch can block one direction of the current flow.

Before initial operation of the converter, the relevant capacitor 5 must be pre-charged. This is straightforward because a current path 22,23,24,25 via the free-wheeling diode 9 is open. The current paths 22,23,24,25 are shown with arrows. Thus, for example, a passive pre-charging of the capacitor is possible according to the current path 22 via the free-wheeling diode 9 of the lower one-way switch 7.

Figure 2:
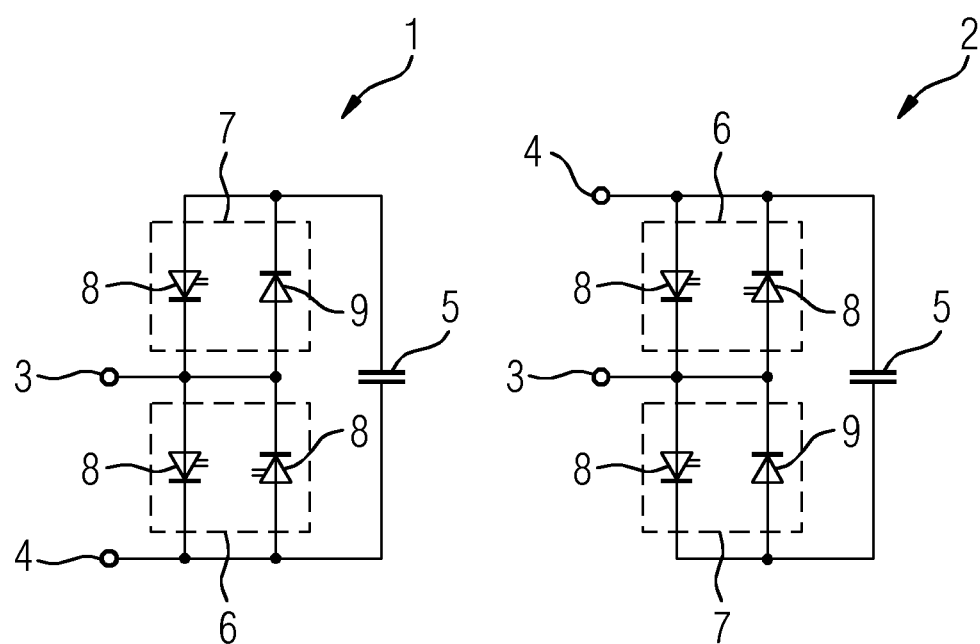
FIG. 2 shows different designs for converter modules with two-way switches.

FIG. 2 shows different designs for converter modules 1,2 with two-way switches 6. In this case, one of the two free-wheeling diodes has been replaced in each case by a further semiconductor switch 8 to form a two-way switch 6, which can block in either current direction. This has the advantage that short circuits on the DC voltage side can be better controlled.

Figure 3:
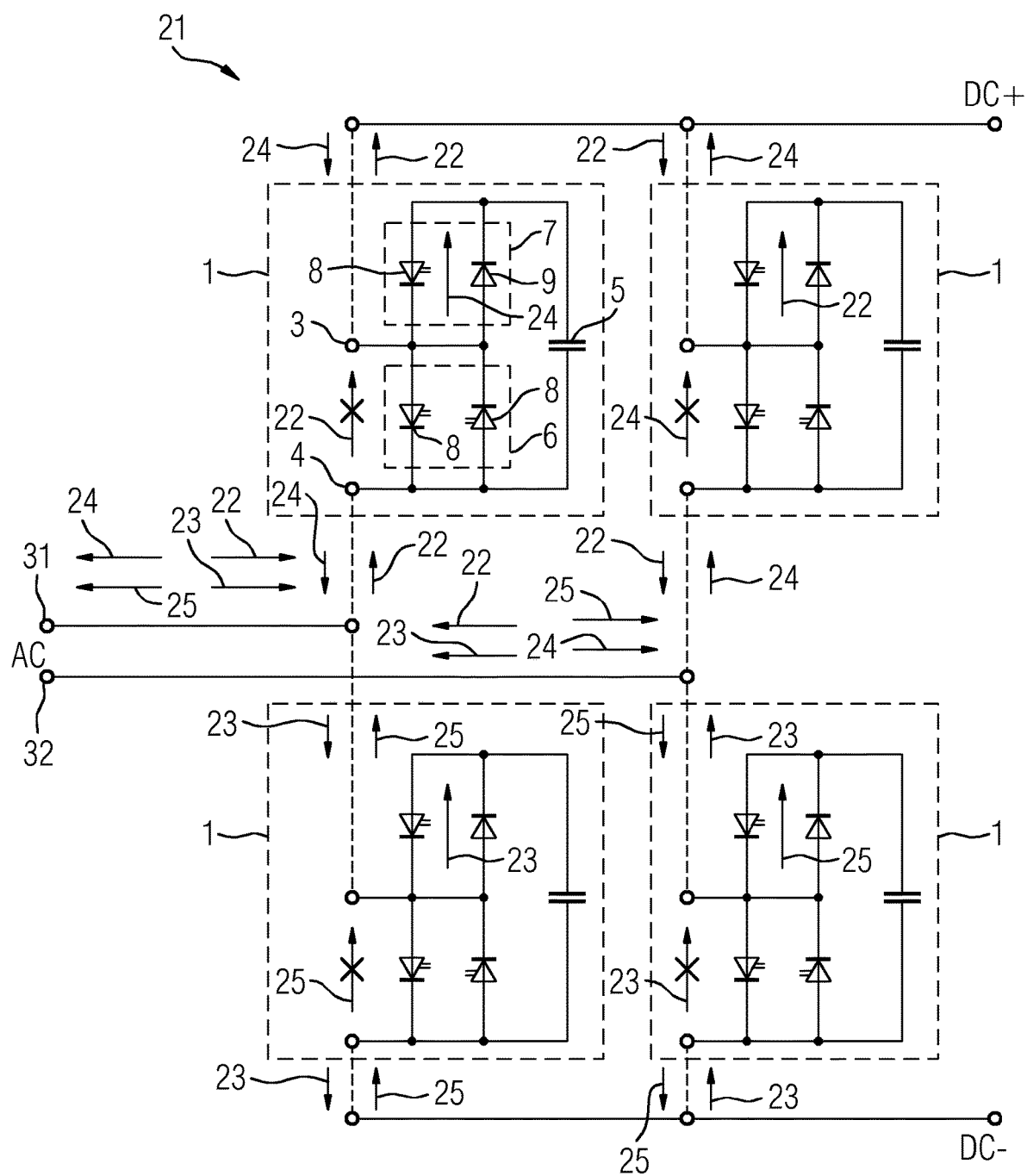
FIG. 3 shows a structure of a multi-level converter with two-way switches.

FIG. 3 shows the same circuit diagram as FIG. 1, except that instead of the converter module 21 from FIG. 1, the converter module 1 with two-way switch 6 according to FIG. 2 is used. This results in the problem that in the de-energized state, i.e. before the first initial operation or after a maintenance operation, the capacitor 5 cannot be pre-charged, because the two-way switch 6 blocks the current path 22 (in a similar way to the current paths 23-25 for the three other modules). This is indicated by the crosses drawn on the arrows.

Figure 4:
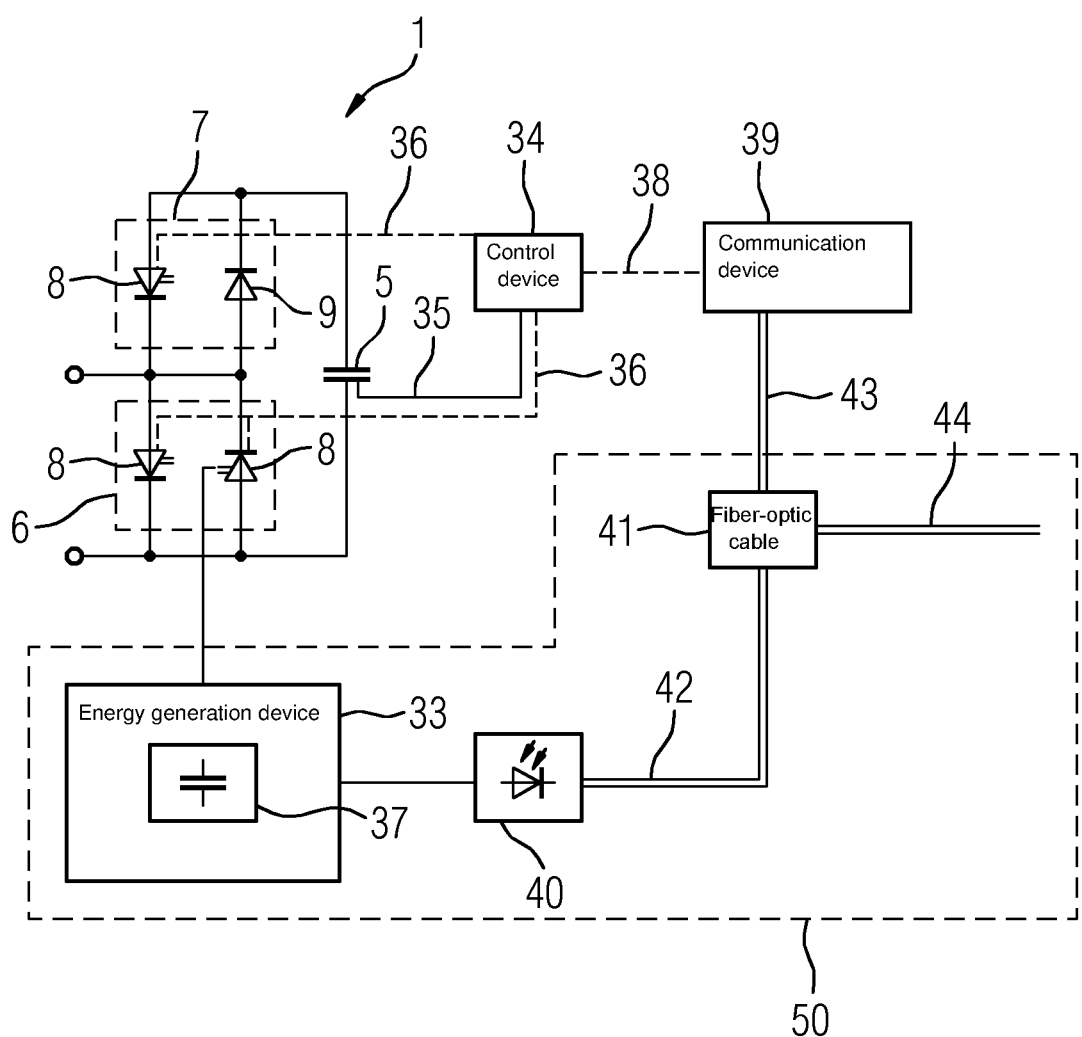
FIG. 4 shows a converter module with an arrangement according to the invention for switching on a two-way switch.

FIG. 4 shows a solution according to the invention to this problem. Shown is a converter module 1 with a one-way switch 7 and a two-way switch 6, the semiconductor switches 8 of which are connected via control lines 36 to a control device 34. The control device 34 can be supplied with power via a cable 35 from the capacitor 5—if this has already been pre-charged.

The right-hand of the two semiconductor switches 8 in the two-way switch 6 is connected via a cable 41 to an energy generation device 33, which has an energy storage unit 37—implemented as a capacitor. The energy generation device 33 also comprises a photodiode 40.

A fiber-optic cable 44 is provided, which is connected to an optical divider 41. By means of the optical divider 41, light can be routed from the fiber-optic cable 41, on the one hand via a fiber-optic cable 43 to a communication device 39 and on the other hand, via a fiber-optic cable 42 to the photodiode 40. The communication device 39 can extract control signals, for example, from the light signals in the fiber-optic cable 44 and transmit these over the data line 38 to the control device 34. The photodiode 40 can generate electric current from the light in the fiber-optic cable 42, which it can store temporarily in the capacitor 37 of the energy generation device 33. If a sufficient amount of energy is available in the capacitor, for example, a voltage is generated at the gate of the semiconductor switch 8 via the cable 41, and this switch is therefore switched in a conducting direction.

The current path through the two-way switch 6 is therefore enabled, to pre-charge the capacitor 5 and to supply the control device 34 from it. The operational standby of the converter is thereby produced.

The energy generation device 33, the photodiode 40, the optical divider 41 and the fiber-optic cables 44 and 42 form an arrangement 50 according to the invention for switching on a two-way switch 6 of a converter module 1.

In accordance with an alternative design, the photodiode 40 can be replaced by a solar cell for recovering energy. Accordingly, the optical divider and the fiber-optic cable 42 are redundant; fiber-optic cable 44 is then directly connected to the communication device 39.

The invention claimed is:

1. A converter module for a modular multi-level converter, comprising:
   a two-way switch;
   an energy generation device connected to said two-way switch for supplying electrical energy for switching on said two-way switch, said energy generation device being a device for converting electromagnetic radiation into electrical energy; and
   a capacitor being pre-charged through said two-way switch when said two-way switch is switched on.

2. The converter module according to claim 1, wherein said energy generation device comprises a solar cell.

3. The converter module according to claim 2, wherein said energy generation device comprises a photodiode.

4. The converter module according to claim 1, wherein said energy generation device comprises a photodiode.

5. The converter module according to claim 4, wherein said photodiode is connected to a fiber-optic cable.

6. The converter module according to claim 5, wherein said fiber-optic cable is additionally connected to a communication device of the converter module.

7. The converter module according to claim 1, wherein said energy generation device comprises an energy storage unit.

8. The converter module according to claim 7, wherein said energy storage unit comprises a capacitor.

9. The converter module according to claim 7, wherein said energy storage unit comprises a super-capacitor.

10. A method for producing an operational standby of a converter module with a two-way switch and a capacitor, the method comprising:
    converting electromagnetic radiation into electrical energy by an energy generation device;
    switching on the two-way switch by way of the electrical energy generated by the energy generation device; and
    pre-charging the capacitor through the switched on two-way switch.

11. The method according to claim 10, wherein a solar cell is used for the energy generation device.

12. The method according to claim 11 wherein a photodiode is used for the energy generation device.

13. The method according to claim 10, wherein a photodiode is used for the energy generation device.

14. The method according to claim 13, which comprises supplying the photodiode with the electromagnetic radiation by way of a fiber-optic cable.

15. The method according to claim 14, which comprises additionally using the fiber-optic cable to communicate with a communication device of the converter module.

16. The method according to claim 10, which comprises using an energy storage unit for the energy generation device.

17. The method according to claim 10, wherein the converter module is a converter module for a modular multi-level converter of a high-voltage DC transmission system.

18. The converter module according to claim 1, wherein the converter module is a converter module for a modular multi-level converter of a high-voltage DC transmission system.

\* \* \* \* \*